United States Patent

[11] 3,597,992

| [72] | Inventors | Dean G. Lowry<br>Tustin;<br>Leland K. Lowry, Garden Grove, both of, Calif. |
|---|---|---|
| [21] | Appl. No. | 848,017 |
| [22] | Filed | Aug. 6, 1969 |
| [45] | Patented | Aug. 10, 1971 |
| [73] | Assignee | Deano Dyno-Soars, Inc.<br>Santa Ana, Calif. |

[54] REVERSE GEAR LOCKOUT MECHANISM
5 Claims, 14 Drawing Figs.

| [52] | U.S. Cl. | 74/476 |
|---|---|---|
| [51] | Int. Cl. | F16h 57/06 |
| [50] | Field of Search | 74/476, 475, 477, 473 |

[56] References Cited
UNITED STATES PATENTS

| 1,241,414 | 9/1917 | Masury et al. | 74/476 |
|---|---|---|---|
| 1,727,646 | 9/1929 | Hunt et al. | 74/476 |
| 2,040,594 | 5/1936 | Bixby | 74/476 X |
| 3,031,898 | 5/1962 | Eaton | 74/476 X |

*Primary Examiner*—Milton Kaufman
*Attorney*—Huebner & Worrel

ABSTRACT: A manual transmission reverse gear lockout mechanism for a rear drive vehicle. The reverse gear lockout mechanism on the gear shift lever is spring loaded to override the shift lever's normal forward gear position, and is activatable by finger control means on the shift lever.

Patented Aug. 10, 1971 3,597,992
3 Sheets-Sheet 2
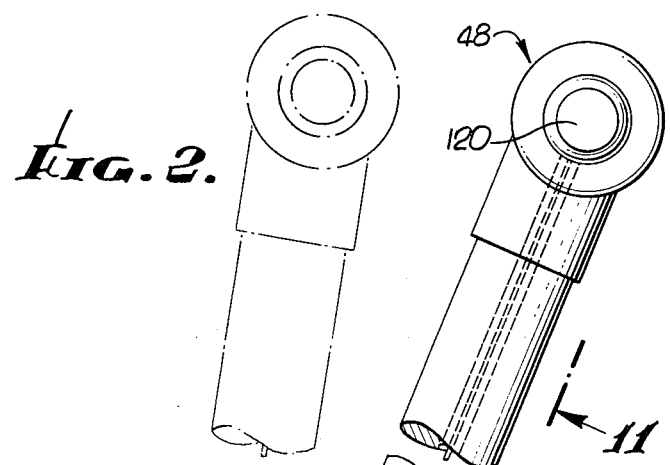
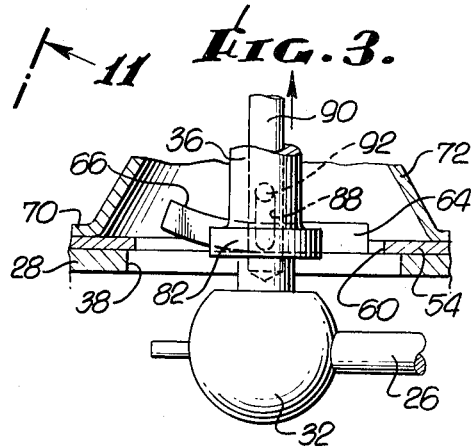
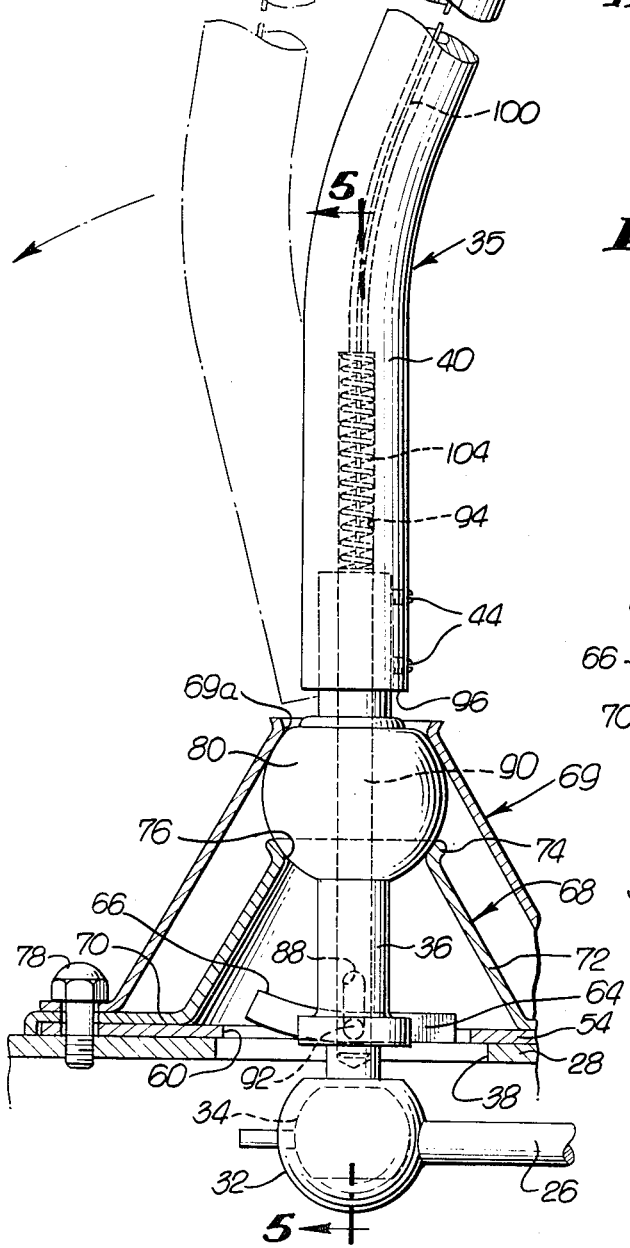
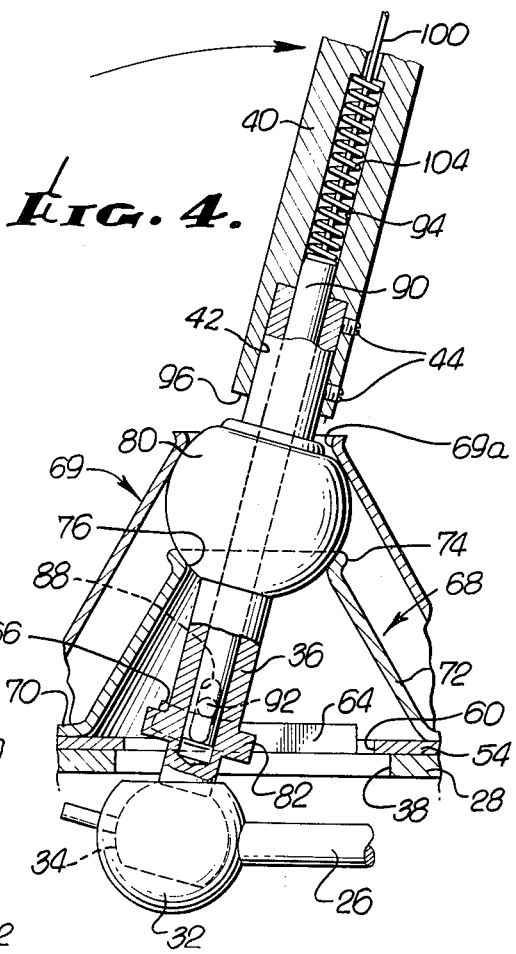
INVENTORS.
DEAN G. LOWRY
LELAND K. LOWRY
By Huebner & Worrel
ATTORNEYS.

Patented Aug. 10, 1971
3,597,992
3 Sheets-Sheet 3
Fig. 5.
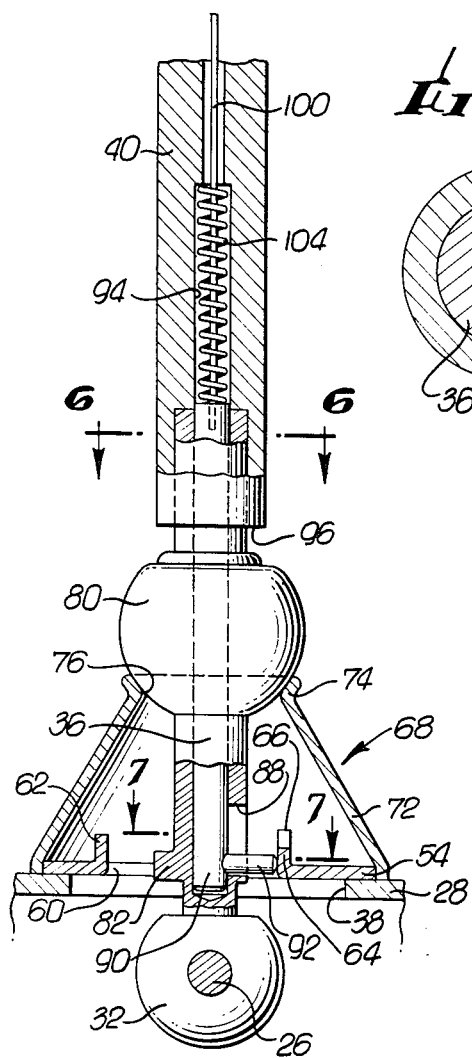
Fig. 6.
Fig. 8.
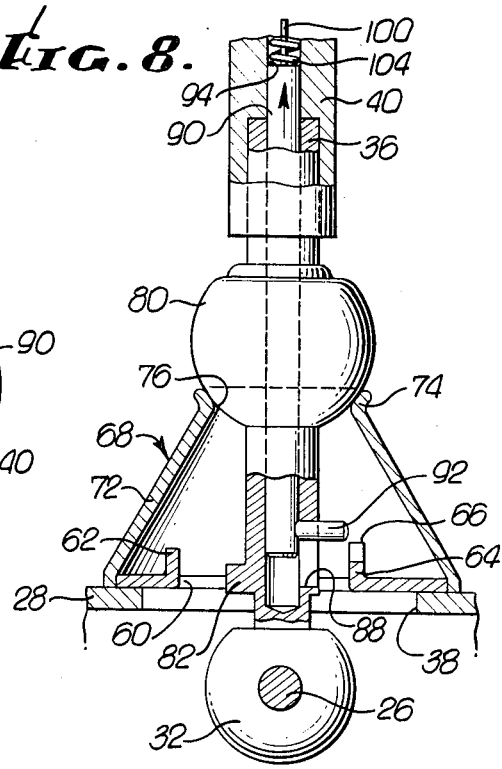
Fig. 9.
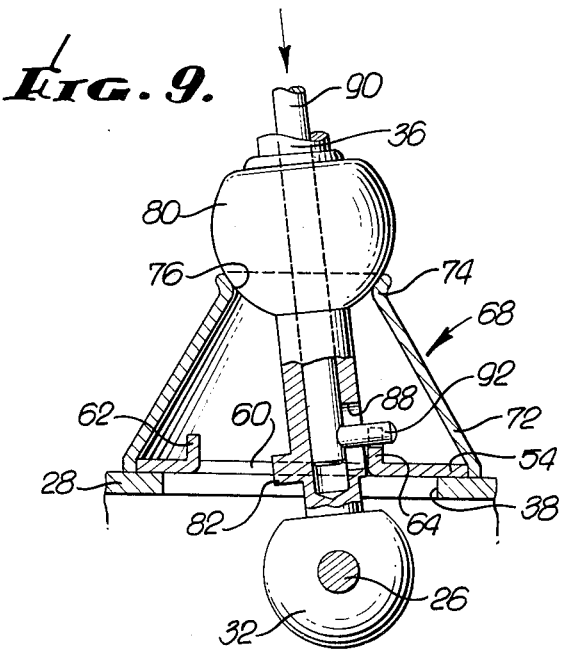
Fig. 7.
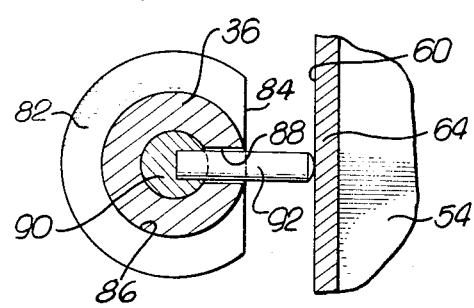
INVENTORS.
DEAN G. LOWRY
LELAND K. LOWRY
By Huebner & Worrel
ATTORNEYS.

REVERSE GEAR LOCKOUT MECHANISM

BACKGROUND OF INVENTION

In most conventional rear drive vehicles, such as Volkswagons, conventional drive transmission is associated with the motor at the rear of the vehicle. In order to activate the transmission through its forward and reverse gears there is mounted to the floorboard of the vehicle, adjacent to the driver's seat, normally in the middle of the vehicle, a gear shift or shift lever. Heretofore, the shift lever has included a stop disk which must be depressed and moved to the left and down to seek the reverse gear in the drive transmission. Such movement has required that the right hand of the driver be used to press down on the conventional gear shift and then move the gear shift to the left and down. This has necessitated extreme hand and arm pressure when the arm is in an outstretched position and requires tremendous physical force to the extent that in some cases it is almost impossible for people with weak arms to drive a rear drive vehicle, such as a Volkswagon.

SUMMARY OF THE INVENTION

It is an object of this invention to provide a pushbutton control means on a conventional transmission floor stick shift or lever to release the shift stick from its normal neutral or forward position to a reverse position without the necessity of expending extreme physical pressure to force the gear shift to move to the reverse position.

By means of a spring loaded gear lockout mechanism on the bottom of the gear shift stick, a stop means may be elevated above the standard shift guide plate, so that the shift lever may be moved laterally to the left and pulled rearwardly thus moving a drive shift shaft whereby the reverse gears of a transmission are engaged.

In the preferred embodiment, the reverse gear lockout mechanism includes a spring loaded stop or lockout pin which projects laterally from a standard stop disk, found on most gear shifts of rear engine drive vehicles, such as Volkswagons.

Further objects, aspects and advantages of the invention will become apparent from the following description taken into connection with the accompanying drawings, wherein:

BRIEF DESCRIPTION OF THE DRAWINGS

FIG. 1 is a side elevational environmental illustration, showing a rear drive vehicle in phantom lines and the location of the gear shift mechanism;

FIG. 2 is a side elevational view of the gear shift mechanism;

FIG. 3 is a side elevational, sectional view, showing the reverse gear lockout pin in an upper position released from the confines of neutral or forward;

FIG. 4 is a detailed sectional view of the gear shift showing the shift in reverse position;

FIG. 5 is a rear elevational view, taken on line 5–5 of FIG. 2;

FIG. 6 is a cross-sectional view taken on line 6–6 of FIG. 5;

FIG. 7 is a cross-sectional view taken on line 7–7 of FIG. 5;

FIG. 8 is a rear elevational view showing the lockout or stop-pin in a released position such as illustrated in FIG. 3;

FIG. 9 is a rear elevational view of the gear shift in a reverse position and the lockout or stop-pin engaging a cam bar;

FIG. 10 is a prospective view of the cam drive plate of the gear shift mechanism;

FIG. 11 is an elevational view of the tee-bar handle of the gear shift showing the pushbutton control means in phantom;

FIG. 12 is a cross-sectional view, taken on line 12–12 of FIG. 11;

FIG. 13 is a detailed sectional view, of the tee-bar handle and pushbutton control means, taken on line 13–13 of FIG. 11; and FIG. 14 is a cross-sectional view, showing the interior of the tee-bar handle of the gear shift with the pushbutton control means depressed.

DESCRIPTION OF THE PREFERRED EMBODIMENT

There is shown in FIG. 1 in phantom lines, for illustrative purposes a rear drive vehicle, generally designated 20, having an engine 22 mounted in the rear of the vehicle and a drive transmission designated 24 associated therewith. In order to activate the transmission 24, there is provided an elongated drive shift shaft 26, which extends forwardly from the transmission 24 within a generally U-shaped channel frame member 28, which in turn is mounted upon the vehicle floor 30.

The drive shaft 26 includes a socket 32 which is adapted to receive a ball 34, such as shown in dotted lines in FIGS. 2 and 3, the whole assembly forming what is known as a ball and socket assembly.

The ball 34 forms an end extension of an elongated shaft lever generally designated 35. The lever 35 includes a rod 36, which projects upwardly through an opening 38 in the U-shaped frame member 28. Mounted on the end of the elongated shift lever rod 36, opposite the ball 34, is a second elongated shift rod 40. The rod 40 includes a bottom recess 42 into which the end of the elongated shift lever rod 36 is inserted, and the shift rod is held thereto by means of a pair of set screws 44.

For convenience sake, the shift rod 40 is normally bent from the vertical approximately at a point midway its length, so that the upper half of the rod 40 will extend rearwardly and be in a comfortable position to be reached by the right hand of the vehicle driver.

At the top 46 of the shift rod 40, there is secured a tee-bar handle generally designated 48. The tee-bar is cylindrical and its axes is normal to the rod 40, and it includes a collar portion 50 of a diameter corresponding to the diameter of the shift rod 40. The collar interfits over the end 46 of the shift rod 40 and is held thereto by means of a set screw 52. As can be seen from the drawings, the tee-bar handle means 48 extends transverse to the vertical direction of the shift rod 40.

Mounted on top of the U-frame 28, over the opening 38 is a retaining means or cam guide plate, designated 54. The plate is generally elongated and includes a forward mounting opening 56 and a rear mounting opening 58. The cam guide plate 54 is further provided with a central opening 60 and on one side is provided with an upwardly extending bar stop 62 and opposite the stop bar 62 there is a reverse cam bar 64, which has an upper cam surface 66 curved upwardly from the plane of the cam guide plate 54. The cam guide plate 54 is positioned over the U-shaped frame member 28 wherein the opening 60 of the plate is in registry with the opening 38 of the frame 28. Mounted over the plate 28 and opening 38 is a metallic cap 68 which includes a flared skirt 70 and truncated portion 72 which terminates in an angular flange 74, forming an upper socket opening 76. The metallic cap 68 and the cam plate 54 are secured to the U-shaped frame 28 by means of cap screws 78.

Seated within the socket opening 76 is a swivel ball 80, which is secured to the elongated shaft lever rod 36.

Surrounding cap 68 and swivel ball 80 is a truncated lever retainer cover 69 including an upper opening 69a wherein the ball 80 is seated to prevent upward displacement of the lever 35. Cover 69 is secured to the U-shaped frame 28 by the cap screws 78.

Adjacent to the bottom end of the elongated shift lever rod 36 is a stop disk 82, best seen in FIG. 7. This stop disk 82 is a semicircular and surrounds the elongated shift lever rod 36, but is terminated in a flat side 84, which is generally parallel to the cam bar 64. The purpose of the stop disk 82 is to restrain the shift lever 35 within the lateral limits defined by bar 62 and cam bar 64 as viewed in FIGS. 5, 8 and 9. In other words, the stop disk 82 will be retained within the opening 60, for conventional shifting into forward gears.

The reverse gear lockout means 85 includes a longitudinal bore 86 within the rod 36, which extends from the top thereof to a point slightly below the transverse plane of the stop disk 82. The shift rod 36 is also provided with an elongated longitudinal slot 88 which extends through the wall thereof, communicating with the bore 86. Slidably mounted within the bore 86 is a slidably mounted rod 90, which extends upwardly slightly beyond the top of the elongated shift lever rod 36 and downwardly to a point on a plane with the stop disk 82. Projecting out through the slot 88 is a stop or lockout pin 92, which is secured in the rod 90 and the pin 92 may be moved up and down within the slot 88.

The shift rod 40 is also provided with an elongated bore 94 corresponding in diameter to the diameter of the rod 90. This bore 94 extends from the bottom 96 of the shift rod 40 to a point adjacent to the central bend in the shift rod 40. At that point, the bore is preferably reduced in diameter and extends through the remaining upward length of the shift rod 40 and extends through the top 46 of the rod 40.

A flexible cable 100 is secured to the upper end of rod 90 and extends upwardly through the bore 94, terminating in a retaining ball 102.

Surrounding the cable 100 in the lower enlarged diameter bore 94, and biased against the end of the rod 90 is a coil spring 104. The spring 104 biases the rod downwardly whereby in its normal position the stop pin 92 is seated against the bottom of the elongated slot 88 such as is seen in FIG. 5. When the pin 92 is in its down position such as seen in FIG. 5, it will butt against the cam plate 64 and prevent excessive lateral movement to the right and lock it out of reverse.

In order to activate the pin 92 to move it from its normal position whereby reverse gear may be obtained, there is mounted in the tee-bar handle section of 48 of the shift mechanism, a finger control means identified as 106. This means 106 is mounted in a transverse longitudinal bore 108 extending through the tee-bar handle 48. At one end 109 of the bore there is a cap 110 to close off the bore. Mounted in the bore 108 is a plunger 111, and seated between the inner end 112 of the plunger 111 and the cap 110 is a compression spring 114.

The plunger 111 comprises an elongated body portion 116, having a slot 118 extending through the diameter thereof and at the end remote from the inner end 112 is a thumb pushbutton portion 120.

The plunger 111 also includes a rounded cam surface 122 at the forward edge of the slot 118, which includes a seat 124 to receive the retaining ball 102 of the flexible cable 100.

At the end of the bore 108 opposite the cap 110, there is a retaining insert 126 adopted to retain the plunger 111 so that it will not pass through the bore 108.

As can be seen from FIG. 14, when the thumb pushbutton portion 120 is depressed in the direction of the arrow, it will move in the bore 108 which in turn will urge the flexible cable 100 over the cam surface 122 and cause the cable 100 to move upwardly. This in turn will be transmitted to the rod 90, which will be moved upwardly, thus moving the stop pin 92 from the position as shown in FIG. 5 to an upper position as shown in FIG. 8, where the pin is raised against the upper end of slot 88. This position, as illustrated in FIG. 8, would be normally referred to as the neutral reverse gear release position. In other words, the shift lever 40 is no longer locked out, but can be moved to where the reverse gear can be engaged.

Once the pushbutton portion 120 has been depressed the spring 114 will urge the plunger 111 to its at rest position as shown in FIG. 11. Further, the flexible cable will be released whereby the rod 90 and stop pin 92 may return downwardly and if the shift 35 has been moved to a position such as shown in FIG. 9, the stop pin 92 will engage the upper camming surface 66 as the gear shift 35 is moved to the position illustrated in FIG. 9. With the spring 104 the pin 92 will be biased against the camming surface 66, and the shift lever 35 can be swiveled backwards, causing the pin and drive shaft 26 to move forward and up whereby the reverse gear is engaged.

It should also be realized that the truncated portion 72 of cap 68 will prevent any downward movement of the stop disk 82 or pin 92 whereby the transmission could be inadvertently moved into reverse.

OPERATION

As before mentioned, the stop of lockout pin 92 is normally in a down position such as is illustrated in FIG. 5, whereby the shift 35 by means of the tee-bar handle 48 may be moved within the confines of the stop bar 62 and cam bar 64 for the normal four forward drive positions, i.e., first, second, third and fourth.

When it is desired to shift the vehicle into reverse gear, the tee-bar handle 48 is gripped with the hand and the thumb depresses the thumb pushbutton portion 120, which in turn transmits motion to move the pin 92 upwardly, such as is shown in FIG. 8. In this position, the gear shifting mechanism is considered to be in a neutral position. At that point the hand of the driver will then move the tee-bar handle 48 to the left, which in turn will swivel the entire assembly on the swivel ball 80, within the socket 76 to a position such as shown in FIG. 9, where the assembly is canted to the left and the stop pin 92 having been elevated, such as seen in FIG. 8, will then ride on the cam bar 64 along the cam surface 66. In this position, the tee-bar handle 48 of the gear shift lever is then pulled rearwardly toward the rear of the vehicle, which in turn will swivel the assembly through the swivel ball 80 in the socket 76 to a position such as shown in FIG. 4, where the stop pin 92 will cam upwardly over the cam surface 66 in turn moving the drive shift shaft 26 forward, thereby engaging the reverse gear of the drive transmission 24.

By the use of this new reverse gear lockout mechanism it can be seen that mere thumb pressure and the normal side motion of the arm is necessary to accomplish the reversing of a rear drive vehicle.

Although the invention has been shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent structures and devices.

We claim:

1. A manual lockout mechanism for engaging a reverse gear of a drive transmission of a rear engine vehicle wherein said drive transmission is associated with said engine comprising: a shift shaft extending forwardly from said transmission; a pivotal shift lever means coupled with said shift shaft and extending upwardly into said vehicle; restraining plate means mounted on said vehicle including an opening therethrough, through which said shift lever means projects whereby said shift lever means may be laterally restrained during forward gear shifting; lockout means on said shift lever adapted to be moved vertically independently of said shift lever and override said restraining plate means whereby said shift lever means may be moved and in turn impart forward and angular movement to said shift shaft causing engagement of said reverse gear; and finger control means on said shift lever means linked to said lockout means adapted to move said last named means, and wherein said lockout means includes a shiftable stop pin adapted to be moved from an at rest position vertically above the restraining plate to a release position.

2. A mechanism as defined in claim 1 wherein said lockout means includes a spring normally biasing said shiftable stop pin to the at rest position.

3. A manual lockout mechanism for engaging a reverse gear of a drive transmission of a rear engine vehicle wherein said drive transmission is associated with said engine comprising: a shift shaft extending forwardly from said transmission; a pivotal shift lever means coupled with said shift shaft and extending upwardly into said vehicle; restraining plate means mounted on said vehicle including an opening therethrough, through which said shift lever means projects whereby said shift lever means may be laterally restrained during forward gear shifting; lockout means on said shift lever adapted to be moved vertically independently of said shift lever and override said restraining plate means whereby said shift lever means may be moved and in turn impart forward and angular movement to said shift shaft causing engagement of said reverse gear; and finger control means on said shift lever means linked to said lockout means adapted to move said last named means, and wherein said finger control means on said shift lever includes a spring loaded pushbutton movable normal to the vertical movement of said lockout means and communicating with said lockout means which control means when manually depressed will release said lockout means.

4. A manual lockout mechanism for engaging a reverse gear of a drive transmission of a rear engine vehicle wherein said drive transmission is associated with said engine comprising: a shift shaft extending forwardly from said transmission; a pivotal shift lever means coupled with said shift shaft and extending upwardly into said vehicle; restraining plate means mounted on said vehicle including an opening therethrough, through which said shift lever means projects whereby said shift lever means may be laterally restrained during forward gear shifting; lockout means on said shift lever adapted to be moved vertically independently of said shift lever ad override said restraining plate means whereby said shift lever means may be moved and in turn impart forward and angular movement to said shift shaft causing engagement of said reverse gear; and finger control means on said shift lever means linked to said lockout means adapted to move said last named means, and wherein said shift lever includes a longintudinal bore, a slidable rod mounted in said bore, an elongated slot in said shift lever and communicating with said bore, said lockout means including a shiftable stop pin mounted on said rod and extending normal to the axis of said rod and projecting through said elongated slot.

5. A mechanism as defined in claim 4 wherein said shift lever includes a stop disc extending normal to the axis of said lever adjacent said shiftable stop-pin.